United States Patent [19]

Bazhal et al.

[11] 3,800,886

[45] Apr. 2, 1974

[54] PERCUSSIVE DRILLING MACHINE

[76] Inventors: Anatoly Ignatievich Bazhal, Ulitsa Franko, 30, kv. 42; Leonid Petzovich Ponomozenro, Ulitsa 50 Let, Komsomola, 19, kv. 27, both of Zheltye Vody Dnepropetrovskoi oblasti, U.S.S.R.

[22] Filed: Oct. 24, 1972

[21] Appl. No.: 300,240

[52] U.S. Cl. .................................. 173/93, 173/108
[51] Int. Cl. ........................ B25d 15/02, E21b 1/12
[58] Field of Search .... 173/93, 93.5, 93.6, 104–108; 81/52.3

[56] References Cited
UNITED STATES PATENTS
1,160,648  11/1915  Peck .................................. 173/108
2,108,989  2/1938  Mack .............................. 173/108 X

*Primary Examiner*—Marvin A. Champion
*Assistant Examiner*—William F. Pate III
*Attorney, Agent, or Firm*—Holman & Stern

[57] ABSTRACT

The machine incorporates an air-operated striking piston whose body contains an air-distribution arrangement and a hammer reciprocating due to the action of compressed air so as to deliver at the end of a work stroke a blow at a drill steel arranged in the front part of the machine.

Accommodated in the front part of the machine is a rotary impulse fronthead whose body contains an annular striking piston with projections and a rotary anvil with co-operative indentations and projections so arranged that their side surfaces and walls of the fronthead body form work stroke and idle stroke chambers which connect to a source of compressed air or atmosphere at regular intervals. The projections of the annular striking piston oscillate in these chambers back and forth and through an angle at a high rate due to the action of compressed air so as to deliver at the end of a work stroke a blow at the cooperative projections of the rotary anvil, causing to rotate the rotary anvil linked with the drill steel. Arranged in the front part of the fronthead body is a ratchet mechanism which assures that the rotary anvil and the drill steel rotate in only one direction.

5 Claims, 10 Drawing Figures

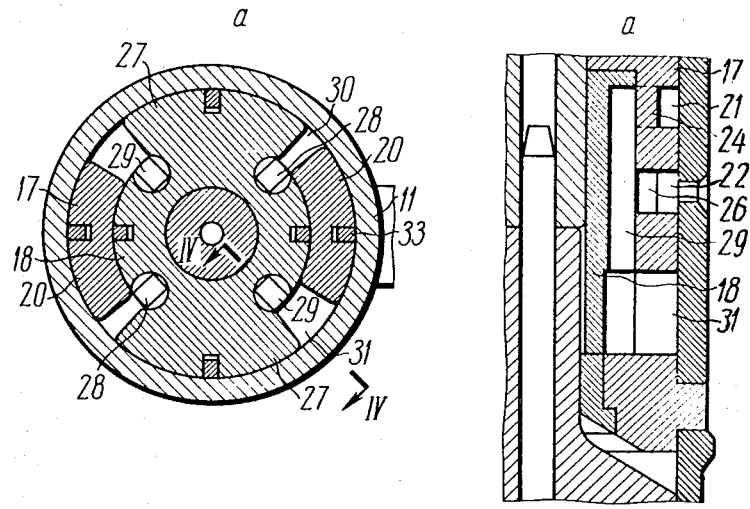
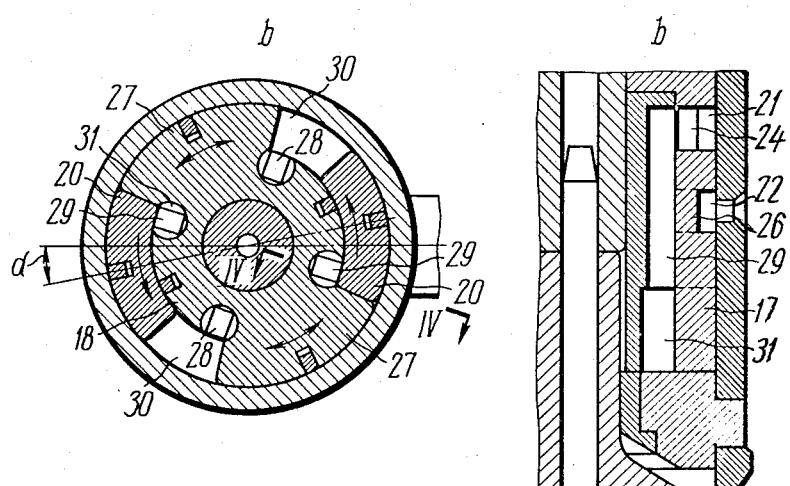
FIG.3
FIG.4

PERCUSSIVE DRILLING MACHINE

BACKGROUND OF THE INVENTION

The present invention relates to air-operated percussive drilling machines and, more specifically, to percussive drilling machines with an independent non-reversible rotation of the drill steel for drilling holes.

PRIOR ART

Known in the art is a percussive drilling machine with an independent rotation of the drill steel comprising an air-operated striking rearhead consisting of a body with a cylindrical bore which contains an air-distribution arrangement and a hammer reciprocating due to the action of compressed air so as to deliver, at the end of a work stroke, a blow at the drill steel arranged in the front part of said machine; a rotary impulse fronthead consisting of a body with a cylindrical bore which contains at its rear end an annular striking piston with annular projections, a rotary anvil with co-operative annular indentations and projections so arranged that their side surface and the wall of said rearhead body form, during each work and idle stroke, air chambers connecting via passages to a source of compressed air or atmosphere at regular intervals and providing for said projections of said annular striking piston space to oscillate both back and forth and through an angle at a high rate due to the action of compressed air so as to deliver at the end of a work stroke a blow at said co-operative projection of said rotary anvil and to cause the rotary anvil to rotate integrally with the drill steel; and a ratchet mechanism arranged at the front end of a fronthead body.

In the known drilling machine, the ratchet mechanism comprises a ratchet ring with internal teeth and an anvil incorporating pawls. The ratchet ring has annular projections on its outside surface and striking against these projections are the annular projections of the annular striking piston as this oscillates both back and forth and through an angle.

The annular striking piston is arranged with its projections in the air chambers formed by the indentations and projections of a statically fixed stator and air-distribution sleeve. The passages which distribute compressed air are arranged so that the blows are of definite force and amplitude, providing thus for a certain performance of the machine.

The blows produced by mutual impacts of the projections of the ratchet ring with those of the annular striking piston are transmitted through the teeth of the ratchet ring and the pawls to the anvil, causing this to turn through a certain angle. The anvil is connected by its end-face detents to a drive sleeve and this, sleeve in its turn, is connected to a spindle holding the drill steel. Owing to this arrangement, the anvil tends to turn the drill steel through a certain angle under the action of blows.

However, the interaction of the spindle and drill steel with the rock being of a resilient nature, the torsional reaction resulting from this interaction tends to turn the spindle integrally with the components of the annular striking piston linked with it in the direction opposite to that of the torque produced by the blow. Since the spindle with the drive sleeve lacks any means of being locked in each of the changing positions, the spindle is free to reverse from time to time if the resilient reaction due to the interaction of the drill steel-rock system exceeds the torque produced. This changes the amplitude of reciprocating and angular oscillations of the annular striking piston, interferes with the regular operation of the air-distribution system in the rotary impulse fronthead and brings the annular striking piston to a standstill or causes it to idle, i.e., to operate without striking against the projections of the ratchet ring linked with the spindle through intermediate components. As a result the spindle stops. Irregular rotation of the spindle with the drill steel impairs the effectiveness of the drilling operation.

Apart from the above, the known drilling machine is designed on sophisticated lines; its air-distribution mechanism is located separately and the ratchet mechanism juxtaposed co-axially with the annular striking piston. This arrangement calls for a multitude of components to be incorporated into the air-distribution mechanism and the mechanism linking the annular striking piston with the spindle. As a result, the known machine is bulky and heavy.

OBJECTS AND SUMMARY OF THE INVENTION

The object of the present invention is to provide a machine which is capable of translating the reciprocating and angular oscillations of an annular striking piston ocurring at a high rate into practically ceaseless rotation of a rotary anvil linked with the drill steel.

Another object of the present invention is to provide a machine which is less sophisticated, bulky and heavy.

These and other objects are accomplished in a percussive drilling machine with independent non-reversible rotation of the drill steel which comprises an air-operated striking rearhead defined by a body provided with a cylindrical bore which contains an air-distribution arrangement and a hammer reciprocating due to the action of compressed air so as to deliver at the end of a work stroke a blow at the drill steel arranged in the front part of said machine; a rotary impulse fronthead defined by a body provided with a cylindrical bore which contains in its rear part an annular striking piston with projections located at the end opposite to the drill steel and a rotary anvil with co-operative indentations and projections so arranged that their side surfaces and walls of said rear rearhead body form, during each work and idle stroke, air chambers connected via passages to a source of compressed air or atmosphere at regular intervals and providing for said projections of said annular striking piston space to oscillate both back and forth and through an angle at a high rate due to the action of compressed air so as to deliver, at the end of a work stroke, a blow at said co-operative projections of said rotary anvil, causing to rotate said anvil and the drill steel linked with the anvil by means of intermediate components; and a ratchet mechanism arranged at the front end of said fronthead body. According to the invention, said ratchet mechanism is interposed between said rotary anvil and said fronthead body and comprises a ratchet wheel linked up with said fronthead body and pawls located in the end face of said rotary anvil facing the drill steel; said ratchet mechanism provides for the rotation of both the rotary anvil and drill steel in only one direction.

A drilling machine arranged on the above lines allows to translate the reciprocating and angular oscillations of the annular striking piston occuring at a high rate into practically ceaseless rotation of the rotary anvil with the drive sleeve and of the spindle with the drill steel.

It is preferred to locate the annular striking piston inside a cylindrical opening of the rotary anvil in order to facilitate a compact arrangement of air passages between working chambers, a source of compressed air and the atmosphere.

It is also preferred to provide in the outside surface of the rotor anvil, inlet and outlet passages and radial passages permanently connected therewith and to provide in the annular striking piston, longitudinal passages on both sides of the projections by means of which passages and said radial passages the striking piston connects, during its reciprocating and angular oscillation, the work and idle strokes air chambers to said radial inlet and outlet passages and, consequently, to a source of compressed air or the atmosphere at regular intervals.

Furthermore, it is preferred to arrange the radial inlet and outlet passages of the rotary anvil so that at least one inlet and one outlet passage is connected simultaneously and individually to one of the two longitudinal passages opening into the work and idle strokes air chambers; such arrangement enhances the operational reliability of the machine at any speed of drilling or, in other words, provides for a rotary impulse fronthead not sensitive to the changes in the resilient interaction of the drill steel with the rock.

Finally is is preferred that the longitudinal passages of the striking piston be arranged symmetrically and have the same length which is not less than the distance between the end face of the annular striking piston opposite to the drill steel side and the edge of the annular inlet passage of the rotor anvil; this arrangement enables the longitudinal passages of the annular striking piston to connect at regular intervals, when the annular striking piston and the rotary anvil are set rotating, with the radial passages of rotary anvil opening into the annular inlet or outlet passage with the result that the drilling machine is of less sophisticated design and is more compact.

The present invention will be best understood from the following description of a preferred embodiment when read in conjunction with the accompanying drawings, in which:

BRIEF DESCRIPTION OF THE DRAWINGS

FIG. 3a and 3b is a section on line III—III of FIG. 2;

FIG. 4a and 4b is a section on line IV—IV of FIG. 3;

DETAILED DESCRIPTION OF THE INVENTION

Figure 1:
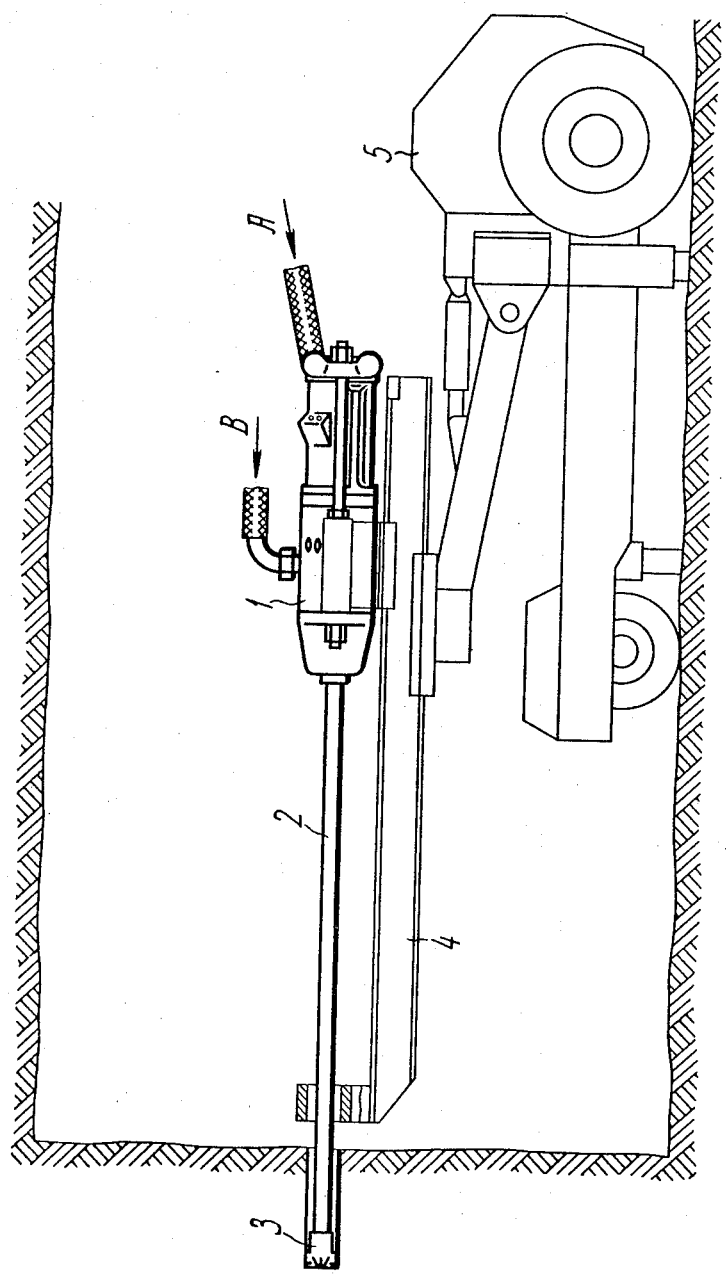
FIG. 1 is a schematic diagram of a drilling rig for drilling holes underground with a percussive drilling machine according to the invention.

FIG. 1 illustrates a rig for drilling holes underground by means of a drilling machine according to the invention which rig comprises a drilling machine proper 1, accommodating at the front end, a drill steel 2 provided with a bit 3 at the tip, and a feed arrangement 4 imposing an axial feed load.

The drilling machine 1 and the feed arrangement 4 are located on a carriage 5 which serves to transport these components to the face and perform all manipulations associated with the setting of the machine and feed arrangement for drilling holes.

Arrows A and B indicate the connections to the compressed air mains of the mine.

The percussive drilling machine 1 with an independent non-reversible rotation of the drill steel shown in FIGS. 2 through 6 comprises an air-operated striking rearhead 6 and a rotary impulse fronthead 7.

The air-operated striking rearhead 6 has a body 8 with a cylindrical bore accommodating an air-distribution arrangement (the air-distribution and on/-off arrangements are not shown in the drawing and can be of any type) and a movable hammer 9. The body 8 is linked with the impulse fronthead through the intermediary of an adapter sleeve 10.

The rotary impulse fronthead has a body 11 with a cylindrical bore limited by the end faces of the adapter sleeve 10 and an adapter sleeve 12 located at the drill steel side.

Arranged at the front end of the body 11 there is a ratchet wheel 13 with teeth 14 (FIG. 6a), with said ratched wheel being linked up with said body. The outside surface of the body 11 is provided with a port 11 for admitting compressed air from a source into the rotary fronthead and with ports 16 for releasing compressed air into the atmosphere.

Located in the cylindrical bore of the fronthead body 11 are a rotary anvil 17 and an annular striking piston 18, both capable of rotating. The rotary anvil 17 is a cylindrical sleeve with a stepped bore and annular indentations 19 located next to annular projections 20 (FIGS. 3a; b) at the end opposite to the drill steel.

Figure 2:
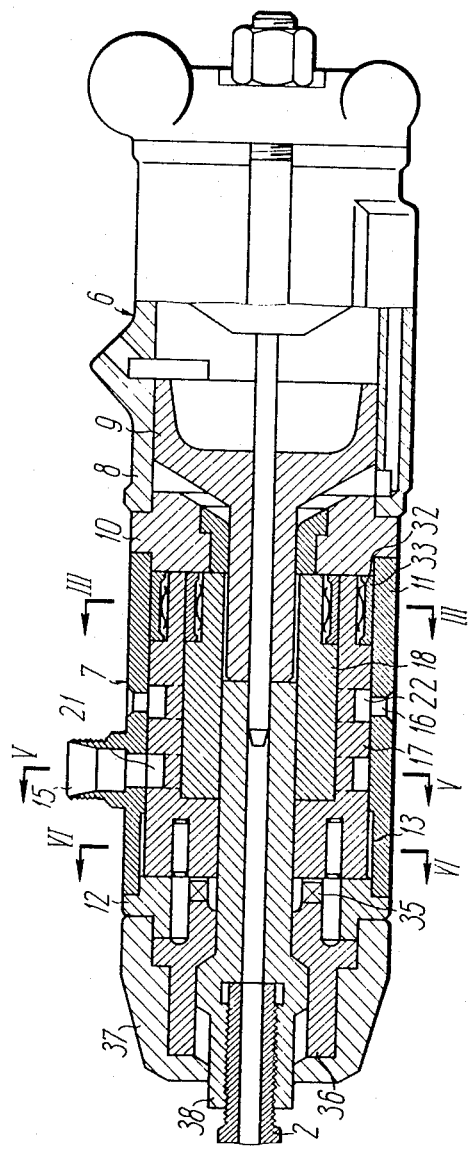
FIG. 2 illustrates a percussive drilling machine according to the invention in longitudinal section.
Figure 6:
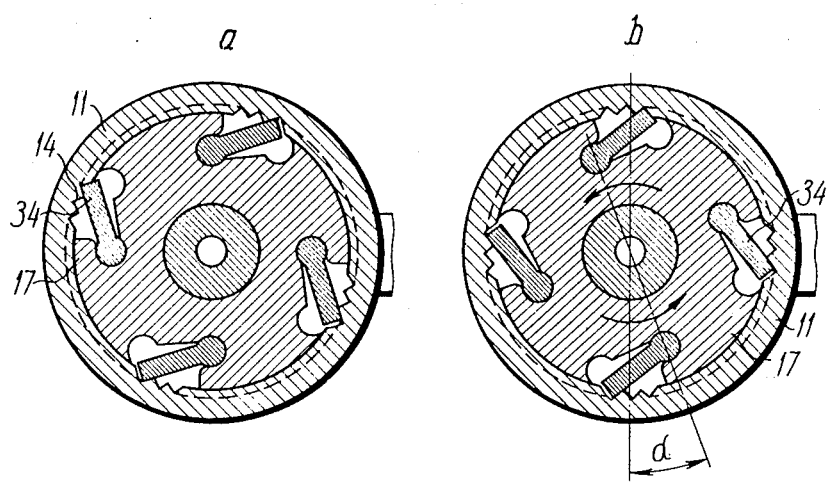
FIG. 6a and 6b is a section on line VI—VI of FIG. 2.
Figure 5:
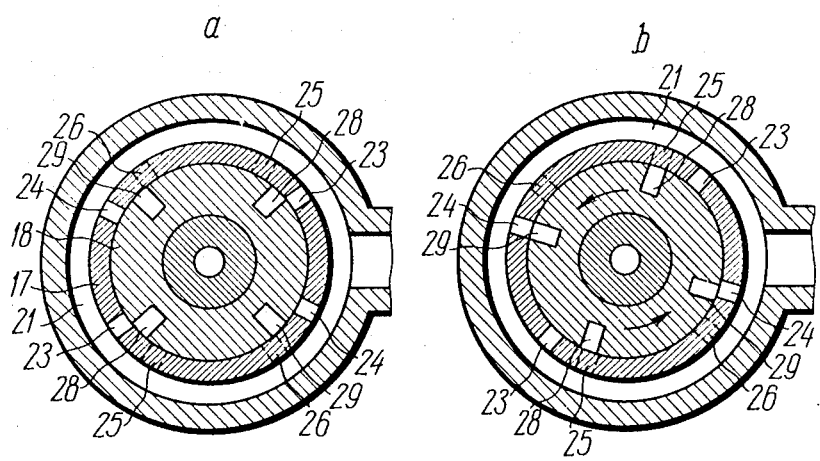
FIG. 5a and 5b is a section on line V—V of FIG. 2.

In the outside surface of the rotary anvil 17 are provided annular air-distribution passages, an inlet passage 21 permanently connected to the compressed air inlet port 15 and an outlet passage 22 permanently connected to the compressed air outlet ports 16 (FIG. 2).

The inlet passage 21 communicates with radial passages 23 and 24 whereas the outlet passage 22 connects with radial passages 25 and 26 of the rotary anvil 17 (FIGS. 5a; b).

The annular striking piston 18 (FIGS. 3a; b) is a cylindrical sleeve with annular projections 27 which is arranged so as to be capable of rotating in the bore of the rotary anvil 17 at the side opposite to the drilling steel 2. Extending symmetrically on both sides of the projections 27 of the annular striking piston 18 are longitudinal passages 28 and 29. The projections of the annular striking piston are arranged in co-operative indentations 19 of the rotary anvil whose projections 20 limit the angular travel of the projections 27. The projections 27 of the annular striking piston 18 divide the space of the indentations 19 in the rotary anvil 17 into work stroke chambers 30 and idle stroke chambers 31. (The number of chambers varies with the specified rating of the rotary fronthead and is governed by the overall dimensions of the machine). The longitudinal passages 28 and 29 placing the chambers 30 and 31 in communication with either the inlet passages 23 and 24 or the outlet passages 25 and 26 are of the same length to provide for said connection of the work stroke chambers 30 and the idle stroke chambers 31 either to the radial inlet passages 23 and 24 or to the radial outlet passages 25 and 26.

The volume of the work and idle chambers is a variable one. When the annular striking piston abuts against the air cushions in the work stroke chambers 30 as shown in FIG. 3a, the volume of the work stroke chambers is at its minimum and that of the idle stroke chambers 31 is at its maximum.

When the projections 27 of the annular striking piston 18 deliver a blow at the projections 20 of the rotary anvil 17, as shown in FIG. 3b, the volume of the work stroke chambers 30 is at its maximum and that of the idle stroke chambers 31 is at its minimum. Each of the chambers 30 and 31 can communicate with either the annular inlet passage 21 or the annular outlet passage 22.

The work stroke chambers 30 can be connected either to the inlet passage 21 via the longitudinal passages 28 and the radial passages 23 or to the outlet passage 22 via the same longitudinal passages 28 and the radial passages 25.

The idle stroke chambers 31 can be connected either to the outlet passage 22 via the longitudinal passages 29 and the radial passages 26 or to the inlet passage 21 via the same longitudinal passages 29 and the radial passages 24.

The chambers 30 and 31 have sealing arrangements in the form of vanes 33 acted upon by springs 32 and arranged in the projections 20 of the rotary anvil 16 and in the annular striking piston 18.

Arranged in the end face of the rotary anvil 17 at its end facing the drill steel are spring loaded pawls 34 (FIGS. 6a; b; the springs are not shown in the drawing for the sake of simplicity) and end-face detents 35 (FIG. 2). The pawls 34 permanently engage teeth 14 of the fronthead body 11 so as to lock the rotary anvil 17 in each of its positions.

The rotary anvil 17 is connected by means of the end-face detents 35 to a drive sleeve 36 (FIG. 2) installed in a cover plate 37. Arranged inside the drive sleeve 36 is a spindle 38 accommodating the drill steel 2 by means of a threaded or tapered hole.

The drilling machine operates on the following lines, the original position is the one shown in FIGS. 3a, 4a, 5a and 6a when the annular striking piston 18 has been brought to a halt due to the braking effect of the air cushions in the work stroke chambers 30. As soon as the drilling machine is activated, compressed air from a source of supply is admitted through the connections indicated by arrows A and B (FIG. 2) into the air-distribution arrangement of the air-operated striking rearhead 6 (arrow A) and into the inlet port 15 of the rotary impulse fronthead 7 (arrow B).

Under the effect of compressed air which has entered the striking rearhead 6, the hammer 9 travels back and forth, delivering at the end of each work stroke a blow at the spindle 38 holding the drill steel 2 with the bit 3 at the fronthead body 11.

When compressed air is admitted through the port 15 into the rotary impulse fronthead 7, it flows through the annular inlet passage 21, the radial inlet passage 23 of the rotary anvil 17 and then through the longitudinal passaged 28 of the annular striking piston 18 into the work stroke chambers 30 (FIGS. 3a; 4a and 5a).

At the same time, the idle stroke chambers 31 are connected through the longitudinal passages of the annular striking piston 18 to the outlets, the radial passages 26 and the annular passage 22, of the rotary anvil 17 or, in other words, to the atmosphere.

While the idle stroke chambers 31 are connected to the atmosphere, the pressure in such chambers is close to atmospheric. In the work stroke chambers 30 the pressure rapidly builds up and the difference in pressure between the chambers 30 and 31 causes the annular projections 27 of the annular striking piston 18 to turn towards the projections 20 of the rotary anvil 17 (this is the work stroke). As the annular striking piston 18 moves further, the longitudinal passages 28 are disconnected from the radial inlet passages 23 of the rotary anvil 17 and the flow of compressed air into the work stroke chambers 30 is cut off. Further movement of the annular striking piston 18 takes place due to the expansion of the compressed air admitted into the chambers 30.

At the same time, the idle stroke chambers 31, so far connected via the longitudinal passages 29 of the annular striking piston 18 to the radial outlet passages 26 of the rotary anvil 14, become disconnected from these passages and the annular outlet passage 22 or, in other words, from the atmosphere.

As the annular striking piston 18 continues its movement, the longitudinal passages 28 are placed into communication with the radial outlet passages of the rotary anvil 17 and the work stroke chambers 30 are connected to the atmosphere.

When compressed air has escaped from the work chambers 30, the annular striking piston 18 continues its movement due to inertia, admitting a new charge of compressed air into the idle stroke chambers 31 through the longitudinal passages 29, radial inlet passages 24 and annular inlet passage 21. At the same time, the projections 27 of the annular striking piston 18 continuing its rotation due to inertia strike at the projections 20 of the rotary anvil 17 causing said anvil to turn through an angle $\alpha$, as shown by arrows in FIGS. 3b and 6b).

On delivering the blow, the annular striking piston 18 turns integrally with the rotary anvil 17 until a pressure build up in the idle stroke chambers 31 and, to a certain extent, the recoil of the annular striking piston projections 27 from the rotary anvil projections 20 will reverse the annular striking piston 18 so that it turns away from the rotary anvil projections.

On its back stroke which is the idle one, the annular striking piston 18 disconnects the longitudinal passages 29 from the radial inlet passages 24 and also disconnects the idle stroke chambers 31 from the radial inlet passage 21 of the rotary anvil 17. At the same time, the annular striking piston 18 disconnects the longitudinal passages 28 from the radial outlet passages 25 and, consequently, disconnects the work stroke chambers 30 from atmosphere.

Continuing its rotation in the same direction, the annular striking piston 18 connects the idle stroke chambers 31 to atmosphere via its longitudinal passages 29, the radial outlet passages 26 and the annular outlet passage 22 of the rotary anvil 17 and also connects the work stroke chambers 30 to a source of compressed air through the longitudinal passages 28, the radial inlet passages 23 and the annular inlet passage 21 of the rotary anvil 17. On turning still further, the striking piston is braked and brought to a halt by the air cushions formed in the work stroke chambers 30. The pressure in these work stroke chambers sharply increases and the difference in pressure acting on the projections 27 in the work stroke and idle stroke chambers 30 and 31, respectively, causes the annular striking piston 18 to start turning towards the projections 20 of the rotary anvil 17, beginning thus the work stroke. The cycle is repeated.

To assure that the work stroke chambers 30 and the idle stroke chambers 31 are reliably connected either to atmosphere or to a source of compressed air without the danger of "dead centers," the radial inlet passages 23 and 24 and also the radial outlet passages 25 and 26 of the rotary anvil 17 are offset with respect to the symmetrically arranged longitudinal passages 28 and 29 of the annular striking piston by an amount which enables at least one of the radial inlet passages 23 and 24 to connect the chambers 30 and 31 either to atmosphere by way of the annular outlet passage 22 or to a source of compressed air through the annular inlet passage 21 of the rotary anvil 17.

The work and idle strokes described above follow in a rapid succesion so that the torque impulses produced by the interaction of the projections 27 of the annular striking piston 18 with the projections 20 of the rotary anvil 17 cause said anvil to rotate at regular intervals; this rotation is transmitted through the end-face detents 35 to the drive sleeve 36 and the spindle 38 with the drill steel 2.

When the rotary anvil 17 oscillates both back and forth and through an angle $\alpha$, the spring-loaded pawls 34 (FIG. 6a) secured to the anvil slip resiliently over teeth 14 of the fronthead body 11 and, on displacing through the same angle, lock the rotary anvil and all components linked therewith (the drive sleeve 36, the spindle 38 and the drill steel 2) in each new position. The pawls 34 prevent these components from reversing due to the resilient reaction of the drill steel under the torsional forces coming into play while the rock is being drilled and since the torque blows at the rotary anvil are produced at a rapid rate said anvil rotates practically ceaselessly and in only one direction integrally with the drive sleeve 36, the spindle 38 and the drill steel 2.

What is claimed is:

1. A percussive drilling machine with independent rotation of a drill steel arranged in a front part thereof comprising an air-operated striking rearhead including a body provided with a cylindrical bore, an air-distribution arrangement and a hammer contained in the cylindrical bore of said body; said hammer reciprocates due to the action of compressed air so as to deliver at the end of a work stroke a blow at the drill steel; said rotary impulse fronthead including a body provided with a cylindrical bore; an annular striking piston with projections and a rotary anvil with co-operative indentations and projections, said piston and said anvil being contained in the bore of said rotary impulse fronthead; work stroke air chambers and idle stroke air chambers defined by side surfaces of said projections of the annular striking piston and rotary anvil and also by walls of the body of said rotary impulse fronthead, said chambers connecting via passages to a source of compressed air or atmosphere at regular intervals; said projections of the annular striking piston being arranged inside said work stroke air chambers in which these projections oscillate back and forth and through an angle at a high rate due to the action of compressed air so to deliver at the end of a work stroke a blow at said co-operative projections of the rotary anvil linked with the drill steel through intermediate components and to cause the drill steel to rotate; a ratchet mechanism arranged at a front end of said fronthead body between said rotary anvil and said fronthead body, said ratchet mechanism comprising a ratchet wheel linked with said fronthead body and spring-loaded pawls located in an end face of said rotary anvil facing the drill steel and permanently engaged with teeth of said ratchet wheel so as to lock said rotary anvil in each position and assure that the rotary anvil and, consequently, the drill steel rotate in only one direction.

2. The drilling machine according to claim 1 in which said annular striking piston is located inside said rotary anvil.

3. The drilling machine according to claim 1 in which said rotary anvil has in its outside surface an annular inlet passage and an annular outlet passage and also radial passages and permanently connected to said inlet and outlet passages, respectively, whereas said annular striking piston has longitudinal passages on both sides of its projections by means of which passages and said radial passages and said striking piston connects during its reciprocating and angular oscillations said work stroke chambers and idle stroke chambers to said annular inlet passage and said annular outlet passage and, consequently, to a source of compressed air or atmosphere at regular intervals.

4. The drilling machine according to claim 3 in which the radial inlet passages and the radial outlet passages of the rotary anvil are arranged so that at least one of the inlet passages and one of the outlet passages are connected simultaneously and individually to one of the two longitudinal passages opening into the work stroke chambers and idle stroke chambers.

5. The drilling machine according to claim 3 in which the longitudinal passages of the annular striking piston are arranged symmetrically and have the same length which is not less that the distance between the end face of the annular striking piston opposite the side at which the drill steel is located and the edge of the annular inlet passage of the rotary anvil enabling the longitudinal passages to connect at regular intervals, when the annular striking piston and the rotary anvil are set rotating, with the radial passages of the rotary anvil opening into the annular inlet passage or the annular outlet passage.

* * * * *